United States Patent
Reist (10) Patent No.: US 7,975,838 B2
(45) Date of Patent: Jul. 12, 2011

(54) DEVICE FOR TRANSMITTING FORCE AND CONVEYING SYSTEM

(75) Inventor: Walter Reist, Hinwil (CH)

(73) Assignee: WRH Walter Reist Holding AG, Ermatingen (CH)

( * ) Notice: Subject to any disclaimer, the term of this patent is extended or adjusted under 35 U.S.C. 154(b) by 93 days.

(21) Appl. No.: 12/525,375

(22) PCT Filed: Jan. 28, 2008

(86) PCT No.: PCT/CH2008/000026
§ 371 (c)(1),
(2), (4) Date: Oct. 12, 2009

(87) PCT Pub. No.: WO2008/092287
PCT Pub. Date: Aug. 7, 2008

(65) Prior Publication Data
US 2010/0072029 A1 Mar. 25, 2010

(30) Foreign Application Priority Data
Feb. 1, 2007 (CH) .................................. 0171/07

(51) Int. Cl.
*B65G 23/14* (2006.01)
(52) U.S. Cl. ........................................ 198/833; 198/850
(58) Field of Classification Search .................. 198/833, 198/850, 716; 74/502.3; 474/154–155
See application file for complete search history.

(56) References Cited

U.S. PATENT DOCUMENTS

| | | | |
|---|---|---|---|
| 1,939,766 A | 12/1933 | Corset | |
| 3,637,067 A * | 1/1972 | Wright | 198/685 |
| 3,757,514 A | 9/1973 | Reist | |
| 4,082,173 A * | 4/1978 | Simon-Kochloffel | 198/330 |
| 4,397,145 A * | 8/1983 | Reist | 59/78 |
| 4,467,705 A * | 8/1984 | Reist | 92/137 |
| 4,505,496 A | 3/1985 | Fohl | |
| 4,609,365 A | 9/1986 | Eberle | |
| 5,103,968 A * | 4/1992 | Skarlupka | 198/833 |
| 6,282,866 B1 * | 9/2001 | Natterer et al. | 53/282 |
| 7,628,266 B2 * | 12/2009 | Reist | 198/779 |

FOREIGN PATENT DOCUMENTS

| | | |
|---|---|---|
| CH | 538065 | 7/1973 |
| CH | 655916 A5 | 5/1986 |
| DE | 2203495 | 8/1973 |
| DE | 3121835 A1 | 1/1982 |
| DE | 3136335 A1 | 4/1983 |
| DE | 10240487 A1 | 3/2004 |

(Continued)

*Primary Examiner* — Mark A Deuble
(74) *Attorney, Agent, or Firm* — Rankin, Hill & Clark LLP (57) ABSTRACT

A conveying system include a guiding channel (12) with at least one conveyor unit (10) that is guided inside it and may be moved along it and a drive unit (30) for driving at least one conveyor unit (10). The conveyor unit (10) includes a series of several links which, when viewed in the axial direction, have a first joint element (1) at their first end and a second joint element (2) at their second end, respectively. The first and second joint elements (1, 2) are formed in a mutually corresponding manner and, as a result, the conveyor unit (10) is provided for transmitting pushing forces. The drive unit includes at least one roller body (35) consisting of a plurality of rollers (31), wherein the rollers (31) can be conveyed in a circular orbit (34) by a roller drive (36).

13 Claims, 8 Drawing Sheets

FOREIGN PATENT DOCUMENTS

| | | | |
|---|---|---|---|
| EP | 0077467 A2 | 4/1983 |
| EP | 0091557 A1 | 10/1983 |
| EP | 1059462 A1 | 12/2000 |
| GB | 2077881 A | 12/1981 |
| WO | 98/13281 | 4/1998 |

* cited by examiner

DEVICE FOR TRANSMITTING FORCE AND CONVEYING SYSTEM

BACKGROUND OF THE INVENTION

1. Field of the Invention

The invention is the field of devices for transmitting force and relates to a conveyor unit and a conveyor system according to the generic term of the corresponding independent claims.

2. State of the Art

Such a conveyor unit is known, e.g. from CH 538 065 (U.S. Pat. No. 3,757,514). A link chain comprises links connected in ball and socket joint-manner, each one with a joint body and a joint socket. In order for a joint body to be able to be introduced into the joint socket of the following link, the joint socket is slotted and thus expandable. In order to prevent an expanding of the socket joint, a sleeve may be laid over it. The sleeve may also serve for low friction bearing of the chain link in a guidance.

In DE 31 21 835 A1 (or GB 2 077 811), a ball and socket link chain is described, the individual chain links of which are separated into two halves along an axial plane and after connection with a succeeding chain link are each held together by holding rings.

CH 655 916 (EP 0 091 557) describes a device for establishing a connection between stations of an installation. The device comprises a link chain similar to the one described in DE 31 21 835 A1, which, however, comprises through hole openings along the longitudinal axis of the chain links. Through these through holes an electric cable is laid, which serves the communication between two stations along the link chain. Instead of the electric cable a light conductor or a wave guide is mentioned. The link chain is conveyable out of a magazine by a first end of the chain. In the magazine, the chain lies in an unordered manner. On this first end of the link, the cable is made fast to a main station. At the other end of the link chain, or the cable, a coupling organ is arranged, which is connectable to the respective intermediate stations, which are arranged along a guiding channel. For this purpose the link chain is conveyed into a position, in which the coupling organ is located at the intermediate station. In this manner the cable can be connected to the intermediate station. There may also be several coupling organs, which are arranged at a distance along the link chain.

WO 98/13281 A1 discloses a force transmission means for transmission of pushing forces. It consists of a succession of transmission elements which abut on their faces and comprise a ring-like ridge or a ring-like groove, respectively, which are pivotable against each other. The transmission elements may comprise an axial through hole through which a connecting means for loose connection of the transmission elements, especially an electric cable is laid.

DE 102 40 487 A1 shows a chain of chain links and connection links arranged inside the chain. The connection links comprise a section in the shape of a calotte which cooperates with a ball-shaped bearing surface of the adjacent chain link. In a different embodiment adjacent chain links together form a ball and socket joint and the chain is held together by a steel cable running lengthwise and coaxially in relation to the chain. The cable may be pre-tensed.

BRIEF DESCRIPTION OF THE INVENTION

The invention, thus, has the object to create a conveyor unit and a conveying system of the kind mentioned initially, which is simple in manufacture and comprises good running characteristics.

This object is achieved by a conveyor unit and a conveying system with the characteristics of the corresponding independent claims.

The conveying system, thus, comprises a guiding channel with at least one conveyor unit guided in the guiding channel and movable along the guiding channel as well as a drive unit for driving the at least one conveyor unit. The conveyor unit hereby comprises a succession of several links, wherein the links each comprise on a first end a first joint element and on a second end a second joint element, wherein the first and second joint elements are shaped correspondingly to one another and, thus, the conveyor unit is designed for the transmission of pushing forces. The drive unit comprises at least one roller body consisting of a plurality of rollers, wherein the rollers are conveyable along an orbit by means of a roller drive, wherein the rollers or tappets (or pusher dogs) moved along with the rollers engage with the links of a conveyor unit and, thus, drive the conveyor unit.

With the combination of this kind of conveyor unit with this kind of driving unit the transmission of high pushing forces is possible.

The conveyor unit preferably comprises a succession of several links which—regarded in an axial direction—each comprise on a first end a first joint element and on a second end a second joint element, wherein the first and second joint elements are shaped correspondingly to each other and the links each comprise an axial through hole. Hereby a traction means designed for absorbing traction forces is laid through the through holes of the several links of the conveyor unit and fixed to a first link and to a last link of the conveyor unit for absorbing traction forces.

Thus, it becomes possible to couple a succession of several conveyor units to each other and to move them as a unit in a conveying system, in particular in a conveying system with spontaneous conveyance (that is, a conveying system, in which not all units are chained together, but separate units can be conveyed and stopped independently of one another). By means of the traction means, the individual links are protected from being drawn apart even if the connections between the links are not particularly strong or if the links are loosely connected and could be drawn apart if no traction means would be on hand. A conveyor unit may, thus, be manufactured with simple elements.

In a preferred embodiment, the traction means is elastic in itself or is fixed to the first link and/or last link of the conveyor unit with an elastic mounting. Hereby, the traction means is preferably pre-tensed. This means that regardless of their position and curvature the conveyor device always has a determined tension in itself and draws the links towards each other.

Preferably, the traction means is not fixed (attached) to the plurality of the other links of the conveyor unit through which the traction means runs. A conveyor unit can, thus, be manufactured in a simple manner as only the first and last links must be connected to the traction means and the other links may only be shifted against each other or snapped together.

In a further preferred embodiment of the invention, the traction means is fixed (attached) to each of the links of the conveyor unit through which the traction means runs.

Preferably, the first joint elements are joint sockets and the second joint elements are joint bodies, which respectively form ball and socket joints together with the joint sockets. Alternatively, the joints may also be formed by a groove and tongue connection according to above mentioned WO 98/13281 A1, which is herewith included as a whole by reference.

The links preferably consist of one-piece base bodies on which the joint sockets and joint bodies are formed. This makes possible a particularly simple mass production, e.g. by means of injection moulding.

Preferably, the joint sockets and joint bodies form a snappable connection without the joint sockets comprising recesses or slots, which would favor an expansion of the joint sockets. Thus, it is prevented that the snapped joint is separated and that the joint sockets are weakened by the recesses. By means of holding rings, which are slid over the joint sockets and prevent their expanding, a snapping out of the joint bodies out of the joint sockets can be prevented more effectively.

Preferably, the through hole in the region of the first and/or second joint element is expanded. This expansion or widening may e.g. be implemented by means of a conical surface. Hereby the transition of this kind of through hole cone to the through hole is preferably rounded. By means of this expansion and rounding a kinking of the traction means when the links are at an angle to one another is reduced.

A conveying system comprises a guiding channel as well as one or several conveying units which are conveyed in or conveyable in the guiding channel. Preferably, the conveying units are conveyable at different distances and independently of one another along the guiding channel. This means that the conveyor units are not interconnected and that drives for selective driving of individual conveyor units are provided. The guiding channel preferably comprises a circular cross section. In curved sections of the course the size, of the cross section varies or forms an oval.

In a preferred embodiment of the invention, the guiding channel is slotted, such that conveyor units with holding means such as pincers or grippers or hooks fixed to them may be used, whereby the holding means protrude from the slot in the guiding channel.

Instead of several separate conveyor units, the conveying system may also only comprise one single conveyor unit, which is movable back and forth along the length of the conveying system. For this purpose, the conveyor unit is approximately of the same length as the guiding channel. By means of a drive the conveyor unit may, together with the fixed working elements such as grippers, electric contacts etc., be brought into predetermined positions along the guiding channel. This region of the guiding channel that comprises these positions is named "active region" in the following. During operation, the conveyor unit may to a large extent be pulled out of the active region of the guiding channel. For this kind of situation CH 655 916 mentioned above provides a storage in which the links of the conveyor unit are piled up. In the present application, instead, a further guiding channel or a further region of the guiding channel is designed as a storage region or storage channel. The guiding channel thus takes up the part of the conveyor unit which is not in the active region. Preferably the storage channel is arranged substantially parallel and alongside the active region.

Alternatively, the guiding channel may also be formed by a straight channel, which, particularly in order to prevent friction forces, runs vertically.

In a preferred embodiment of the invention, the conveying system comprises a drive unit for driving of conveyor units along the guiding channel, wherein the drive unit comprises a roller body consisting of a plurality of rollers. The rollers are conveyable in an orbit, wherein the rollers or the tappets (pusher dogs) moved along engage with the links of a conveyor unit and drive them in this manner.

In a further preferred embodiment of the invention, a conveyor unit forms a closed loop, which is guided around or through a driving means. Hereby, the driving means and the output means for exerting or absorbing traction forces or pushing forces are formed by the conveyor unit. The driving means and the output means may be gear wheels or drive units as described above. In this manner a gearing is formed in which the axes of the driving means and the output means may lie in an arbitrary spatial relation to one another. Hereby, it is also possible for the conveyor unit to comprise no traction means at all, the links being guided in a circulating guiding channel.

SHORT DESCRIPTION OF THE DRAWINGS

In the following, the object of the invention is explained in more detail on the basis of preferred embodiment examples, which are shown in the attached drawings in a schematic manner. Hereby.

The reference numerals in the drawings and their denotations are summarized in the reference numeral list. In the figures identical parts are basically denoted with identical reference numerals.

DETAILED DESCRIPTION OF THE INVENTION

Figure 1:
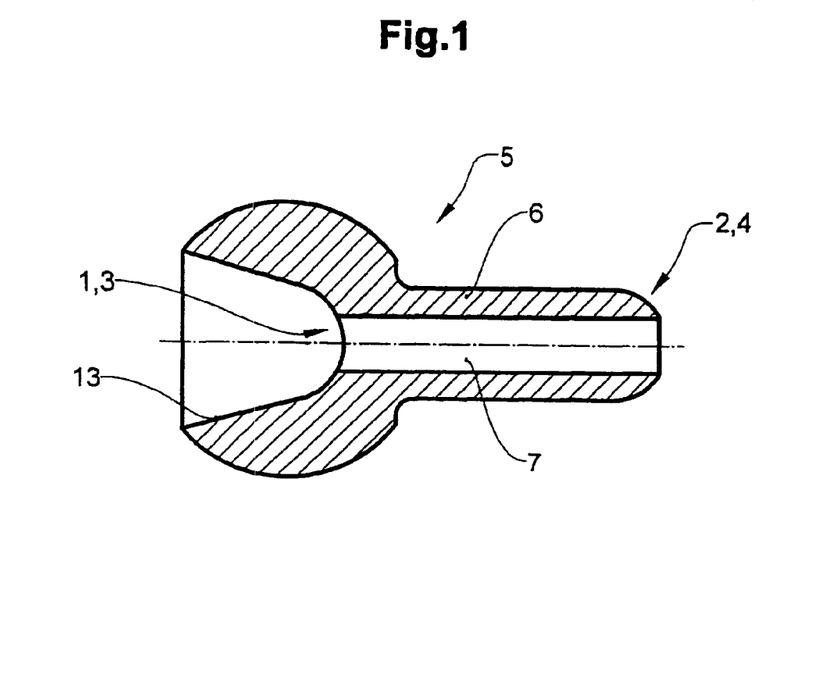
FIG. 1 shows a longitudinal section of a one-piece link of a conveyor unit.

FIG. 1 shows a longitudinal section of a link 5 of a conveyor unit. The link 5 is rotationally symmetric in relation to the axis of symmetry of the representation. The link 5 comprises a first joint element 1, which is designed as joint socket 3 as well as a second joint element 2, which is designed as joint body 4. The link 5 comprises a one-piece base body 6 on which the joint socket 3 and the joint body 4 are designed to correspond to one-another, i.e. they comprise inner and outer spherical surfaces of the same radius, such that they form a ball and socket joint. For this purpose, a joint body 4 of a link is placed in a joint socket 3 of an adjoining link. The joint socket 3 merges into an inner cone 13, which limits the movability of the inserted joint body 4 in the joint to a predetermined angle. An outer surface of the joint socket 3 is designed for sliding along a guidance. For this purpose the first joint element 1 preferably has the form of a ball, or more in general of a spatial rotation ellipsoid. The second joint element 2 preferably has the form of a rotation cylinder, which connects to the first joint element 1 on one end and merges into joint body 4 at the other end. Thus, the links 5 are loosely introducible (pluggable) into one another, they do not comprise a snap joint. The links 5, thus, can be drawn apart by means of pulling insofar as they are not drawn together by a traction means.

Each of the links 5 preferably comprises a through hole 7 which runs along the longitudinal axis of link 5 from the joint socket 3 to the joint body 4.

Figure 2:
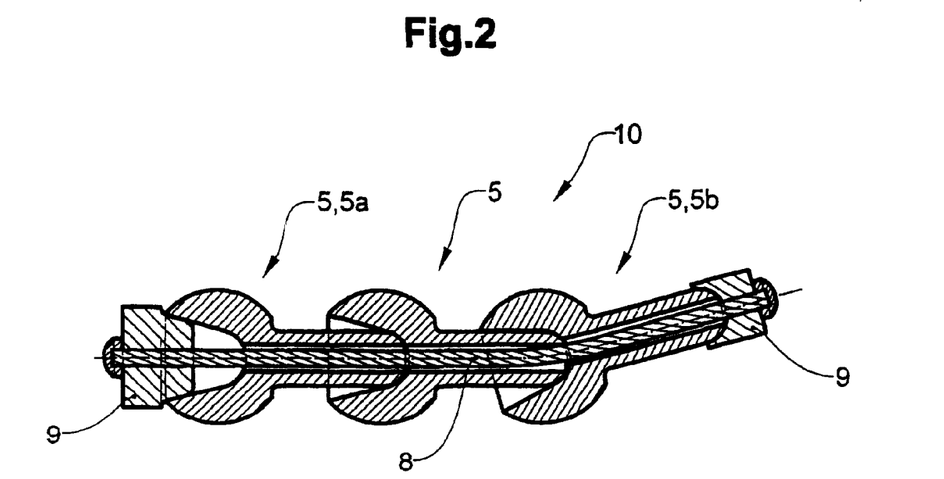
FIG. 2 shows a conveyor unit with several such links.

FIG. 2 shows a conveyor unit 10 with several such links 5. A traction means 8, e.g. a wire rope or a plastic rope is laid through through holes 7 of the links 5 and is fixed to a first link 5a and a last link 5b of the conveyor unit 10 each by means of a fastening means 9. The traction means 8 is preferably pre-tensed, such that the links 5 of the conveyor unit 10 are pressed against each other and held together. The pre-tension can be generated by means of the traction means being elastic or by means of the traction means being connected elastically to the first or last link 5 (not shown). Slight changes of length of the traction means 8, which may occur when the conveyor unit 10 is bent, are compensated by this elasticity.

Figure 3:
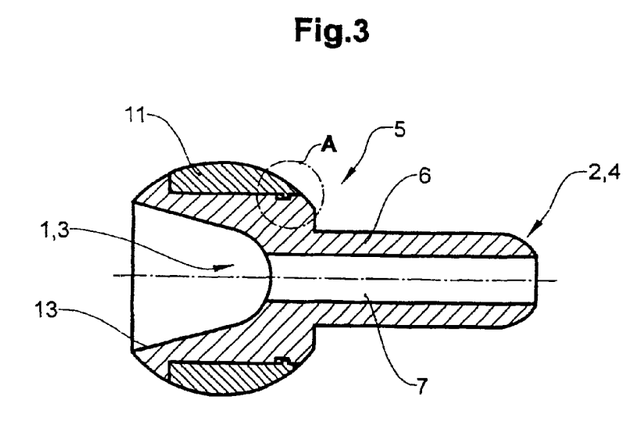
FIG. 3 shows a link with a sliding ring.

FIG. 3 shows a link 5 with a sliding ring 11. The sliding ring 11 preferably comprises a cylindrical inner surface, which is slipped over the corresponding outer surface of the first joint element 1. Hereby, as shown in the region denoted "A", a ring shaped groove is formed into which a wedge shaped protrusion snaps. The wedge may, inversely, be located on the first joint element 1 and the groove on the sliding ring 11. The sliding ring 11 is preferably made of a material, which effects low friction and low wear material pairing with the material of a guiding channel.

Figure 4:
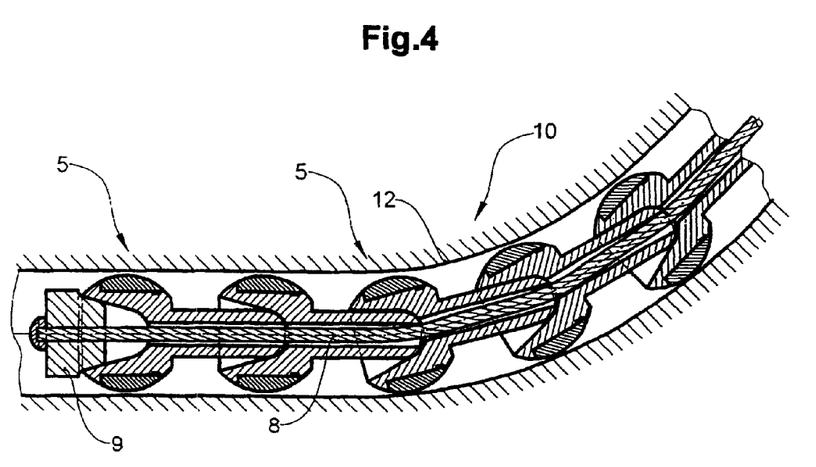
FIG. 4 shows a conveyor unit with several such links in a guiding track.

FIG. 4 shows a conveyor unit with several such links 5 in a guiding track or a guiding channel 12. The guiding channel 12 may be slotted, such that the holding elements for objects to be conveyed may be fixed to one or several links 5 and may protrude from the slot in the guiding channel 12. The guiding channel 12 has a substantially circular or elliptic cross section, corresponding to the outer diameter of the links 5.

Figures 5, 7, 16:
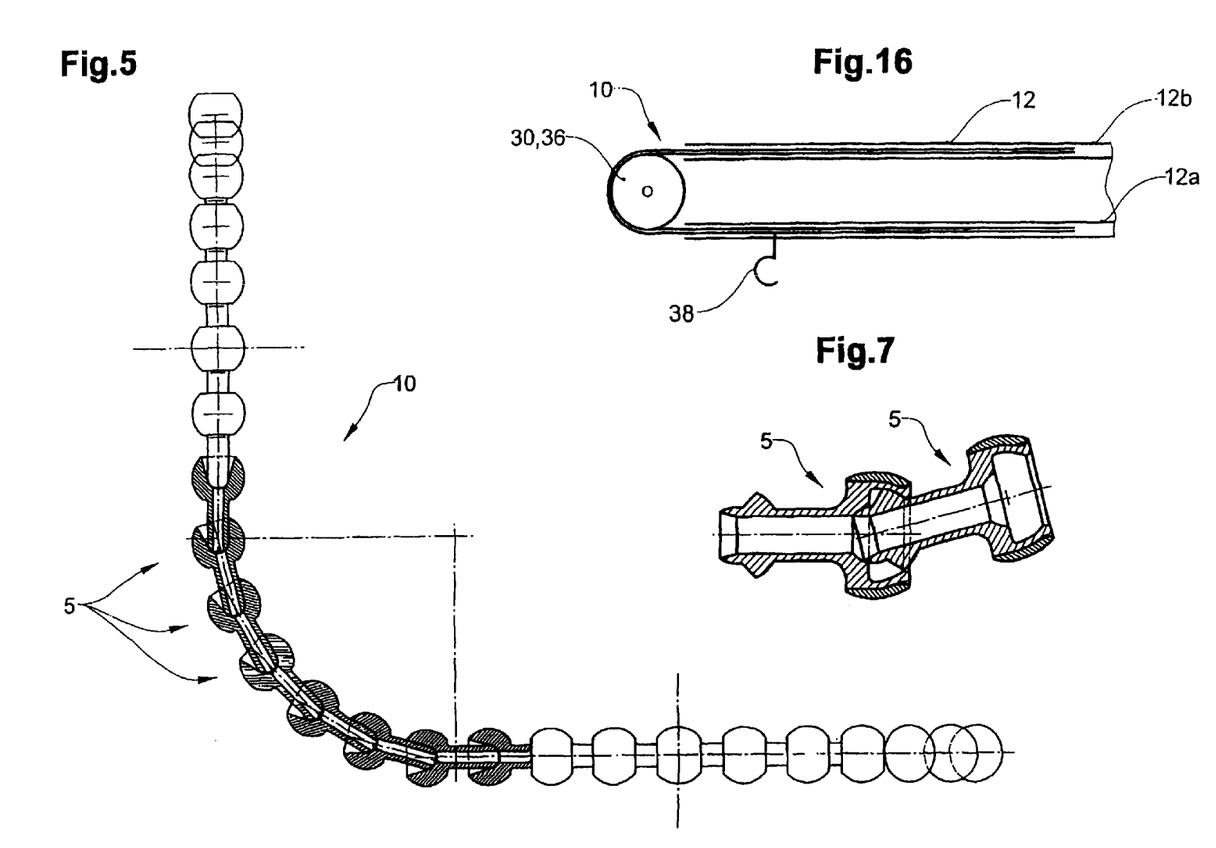
FIG. 5 shows the course of a conveyor unit in an angular gear.
FIGS. 6 to 10 show further embodiments of links of conveyor units.
FIG. 16 shows a conveyor unit with a storage channel.

FIG. 5 shows an exemplary course of a conveyor unit in an angular gear. Hereby the guiding channel 12 which surrounds the conveyor unit 10 is not shown in order to provide better illustration. It is also possible to give any spatial course to the guiding channel 12 such that it is curved in three dimensions. Only the curving radius is restricted in accordance with the opening angle of the inner cone 13 of the links 5.

FIGS. 6 to 10 show further embodiments of links of conveyor units. In all these embodiments, the first and second link elements 1, 2 are designed such that they form a snap joint. In addition the first and second joint elements 1, 2 each form ball joints with two concentric balls. The smaller bearing surface and the ball surface is defined by a first joint body surface 14 on the joint body 4 and a corresponding first joint socket surface 15 on the joint socket 3. The larger bearing surface and ball surface is defined by a second joint body area 17 on the joint socket 4 and a corresponding second joint socket surface 17 on the joint socket 3. The smaller ball section absorbs axial pushing forces between the links 5 and centres the links on one another, the larger ball section absorbs axial pulling forces between the links. Characteristics and advantages of a similar arrangement are mentioned in the above mentioned publication U.S. Pat. No. 3,757,514, which is herewith included by reference in its entirety. However the links 5, according to the present application, do not comprise cuts which make the joint sockets expandable. The joint socket 3 comprises, on an outer end of the second joint socket surface 17, a joint socket opening 18 which is larger than the diameter of the first joint body surface 14 but somewhat smaller than the largest diameter of the second joint body surface 16.

The joint bodies 3 and, in particular, the links 5 as a whole are preferably made of a technical plastic such as e.g. nylon or polyoxymethylene (POM) or polyamide (PA) or polypropylene sulphide (PPS) of a filled plastic with inclusions of e.g. glass fibres, mineral fibres or carbon fibres. If the links 5 comprise inclusions they are preferably combined with sliding rings 11 without inclusions. As a production method for large numbers, an injection moulding method is to be used. This also holds for the links 5 according to FIGS. 1 to 5.

The joint sockets 3 are somewhat expandable due to the elasticity of the material and the joint bodies 4 are somewhat compressible such that a snap connection may be produced. In order to facilitate this, a transition surface 20 between the first joint body surface 14 and the second joint body surface 16 is slightly chamfered, i.e. it forms a conical surface, wherein the cone is coaxial to the longitudinal axis of link 5 and its imaginary tip points towards the joint element 2. When bringing together two links 5, the transition surface centres the two links and expands the joint socket opening 18.

The through hole 7 leads from the first joint socket surface 15 to the first joint body surface 14. The through hole 7 preferably comprises an enlargement in the form of a through hole opening cone 19 in the region of the first joint body surface 14. Preferably, the transition between the inner surface and the through hole 7 and the through hole opening cone 19 is rounded (not shown). Thus a strain on the traction means by kinking is prevented.

Figure 6:
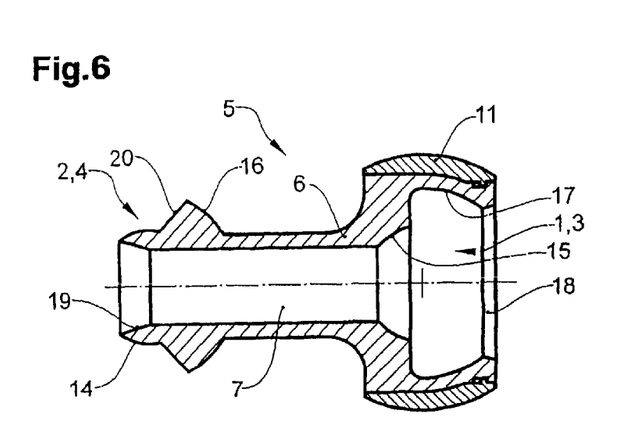
Figure 8:
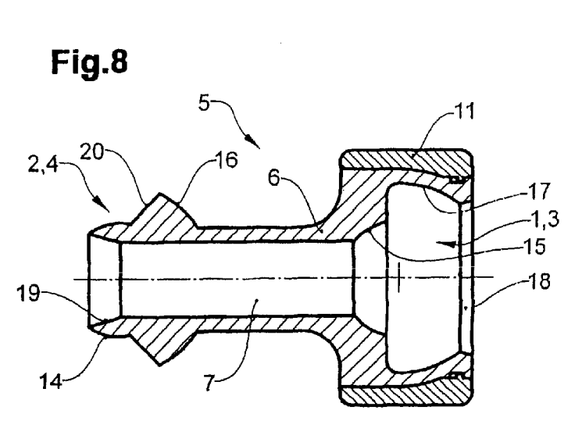

FIGS. 6 to 8 show variants in which, after snapping together two links 5 a sliding ring 11 is slipped over each first joint element 1. Thus, a release of the snap joint is hindered. FIG. 6 shows a sliding ring 11 with an e.g. rotationally ellipsoid outer surface curved in three dimensions. This comprises a good movability in bent conveying paths. FIG. 8 shows a link 5 with a sliding ring 11 with a mainly cylindrical outer surface. This link 5 is, thus, stabilised in an axial direction in a cylindrical guiding channel 12, which comprises a diameter barely larger than the sliding ring 11. Consequently, however, the guiding channel 12 must comprise a slightly larger diameter in the curved regions than in the straight regions in order to allow the necessary buckling of the links 5 in the curves. The sliding rings 11 are engaged in analogy to the embodiment in FIG. 3.

FIG. 7 shows two connected links 5 according to the variant of FIG. 6, with a maximum angle of 15° between the axial directions of the links 5. With this angle, the walls of the through hole opening cone 19 of one link are aligned with the through hole 7 of the succeeding link 5.

Figure 9:
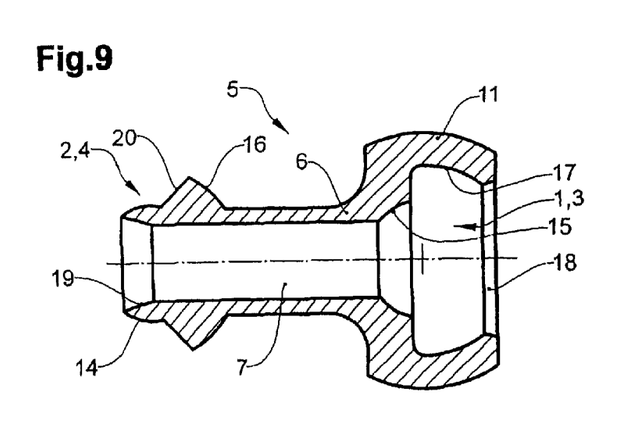

FIG. 9 shows a link 5 without a sliding ring 11. An outer surface of the joint socket 3 thus forms a sliding surface on which the link 5 glides through the guiding channel 12. The remaining properties are analogous to those of the other snap-together links 5.

Figure 10:
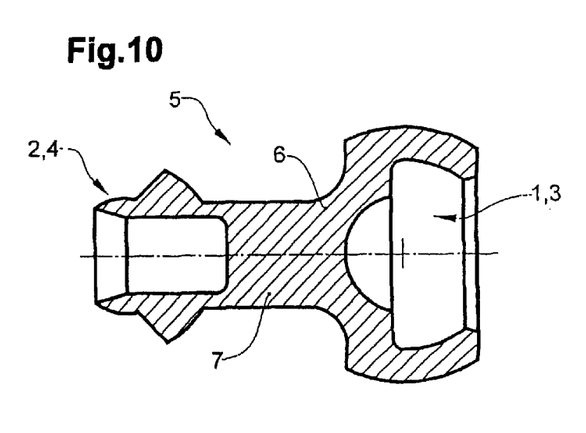

FIG. 10 shows a link 5 without through hole. Hereby, however, in the region of the first joint element 1, instead of a through hole, an opening leading only partly into the base body 6, e.g. a blind hole is provided. This opening extends along the region of the second joint element 2, such that its compression for snapping the links is made easier. Naturally this kind of opening may be combined with the other embodiments.

Figure 11:
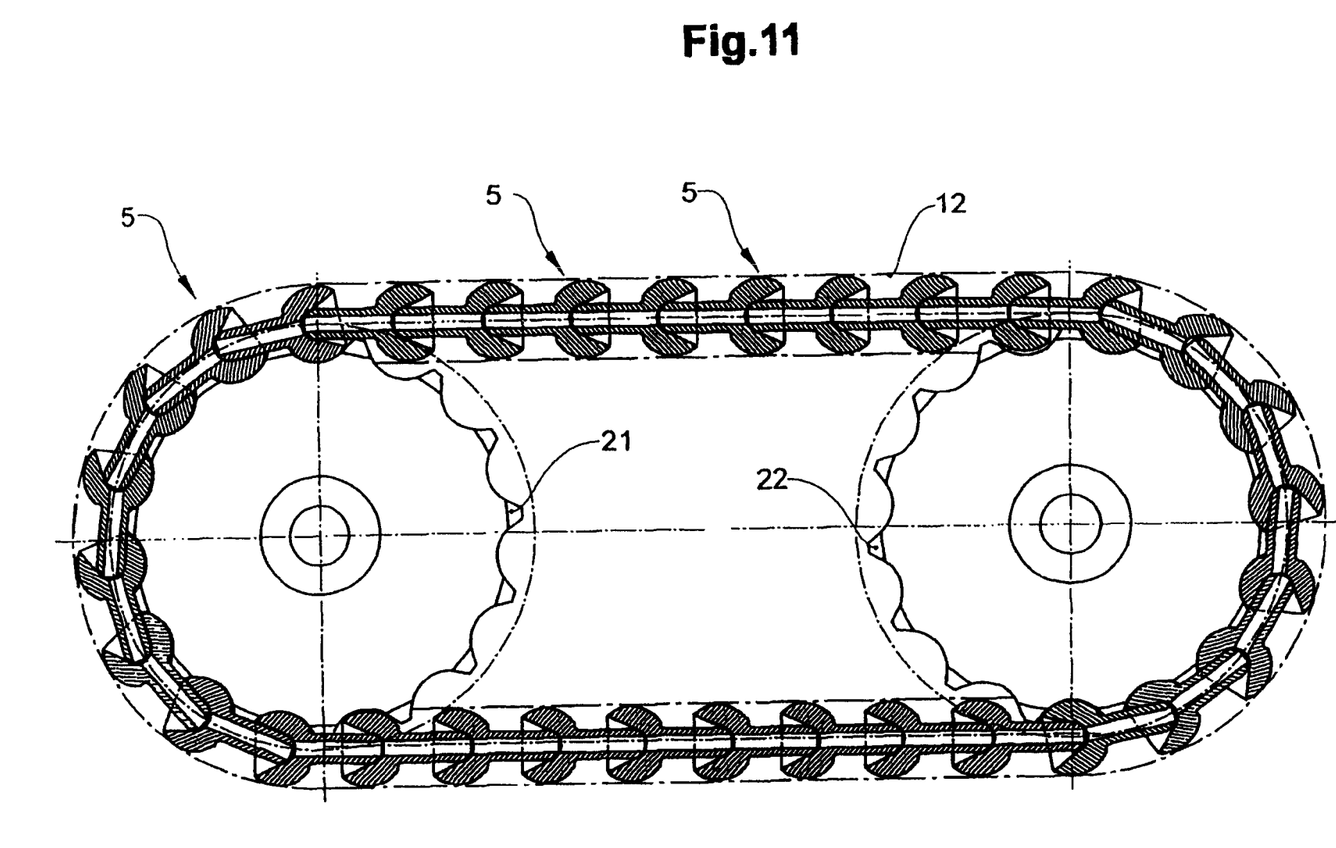
FIG. 11 shows a gearing.

FIG. 11 shows a gearing which is implemented by a combination of links 5 according to the embodiment of FIG. 1, but may also be implemented with the other links 5 according to FIGS. 3 or 6 to 10. The links 5 are guided around driving means 21 and drive output means 22, which here are formed by gear wheels. Alternatively, they may also be implemented by drives as shown in the following figures. The function of driving means 21 and drive output means 22 may, naturally, according to where a drive is arranged, be inverted. The section between driving means 21 and driving means 22 may, as shown in FIG. 5, be guided around any corners. The axial direction of driving means 21 and drive output means 22 can also be at any angle askew in relation to one another.

Links 5 may also be connected to one another by means of a traction means 8, wherein the traction means 8 are fixed to one or several or no links 5 at all and is able to be loaded by a pulling force (traction force). Depending on whether and to which link 5 the traction means 8 is fixed, a succession of links 5 may transmit traction forces and pushing forces or only pushing forces.

Figure 12:
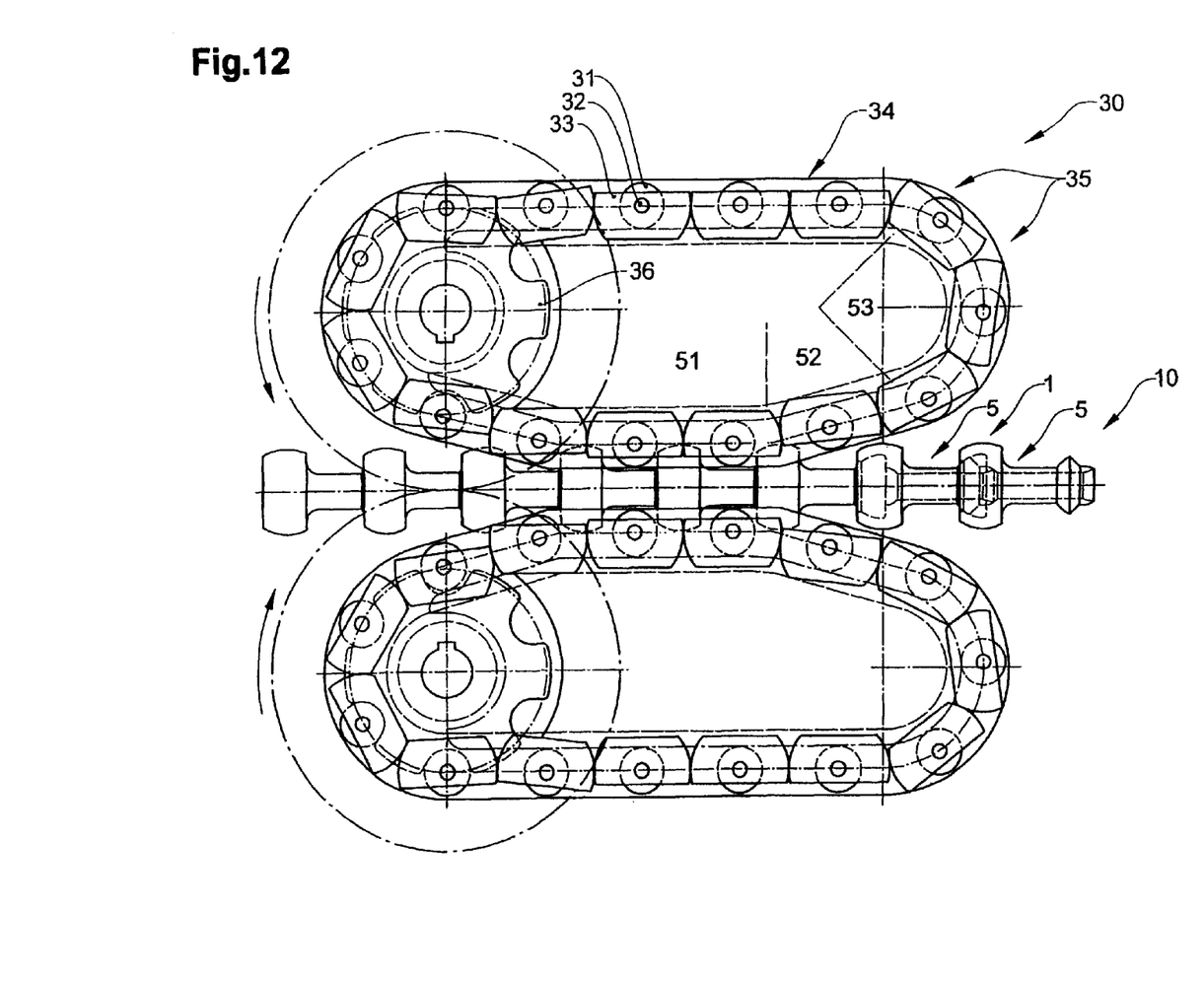
FIG. 12 shows a drive for conveyor units.

FIG. 12 shows a drive for conveyor units 10 according to the invention with a drive unit 30. This kind of drive solves the problem that either the chain must be wound around a gear wheel, as shown in FIG. 11, or—with a course of the conveyor units 10 running in a straight line—the driving force can only be introduced at one point of the conveyor unit 10. This drive comprises a roller element in the sense of WO 2005/113391 A1 or WO 2005/113392 A1 of the same applicant, the content of these applications herewith being included by reference.

The roller element, thus, comprises a roller body 35 which rolls and is guided in an orbit 34. Hereby, the roller body 35 comprises a plurality of rollers 31 which are connected to each other or follow one another loosely and are separated from each other by means of distancing elements 33. The distancing elements 33 preferably form a bearing for axes 32 of the roller 31 and comprise in a running direction of the rollers 31, in at least one direction, a larger extent than the rollers 31. Thus a counter body—in the present case a conveyor unit 10—can roll over the rollers on the orbit 34, wherein the distancing bodies 33 prevent successive rollers 31 from grinding against each other. The distancing bodies 33 comprise a cylindrical face in front and at the back, seen in running direction, which face is coaxial in relation to the roller axes 32. Thus these surfaces of succeeding distancing elements 33 roll on each other in the curved orbit sections of orbit 34 without friction. The roller body 35 is driven by a roller drive 36, e.g. a gear wheel, which engages in or between the rollers of the roller body 35.

The distance between the roller axis 32 is equal to the distance between two successive links 5. The rollers 31 are mounted at each end in a distancing element 33 each and engage in a middle region of the rollers 31 (viewed in cross-section of the orbit 34, in running direction of the rollers 31) with the links 5 of the conveyor units 10. Hereby, the rollers 31 e.g. press against radially protruding outer surfaces on the first joint elements 1.

In a different embodiment of the invention, a roller chain with mutually coupled chain links is provided instead of the roller body 35, wherein the chain links comprise tappets (pusher dogs) which engage between the links 5 of the conveyor units and thus transmit a pushing force and/or a traction force to the conveyor units.

Preferably, the orbit 34 comprises a straight-lined first orbit section 51 on which the roller body 35 is guided in parallel to the conveyor unit 10 and is in engagement with the conveyor unit 10 and a third orbit section 53 on which the roller body 35 changes direction and possibly is also driven. The third orbit section 53 is e.g. circular. Between the first and third orbit section, a second orbit section 52 is arranged as transition. This second orbit section 52 comprises a larger curve radius than the third, i.e. a smaller curvature. Thus, the roller body 35 is gradually guided towards the links 5 of conveyor unit 10 when engaging and prevents roller 31 and links 5 which are not positioned precisely from becoming jammed.

Figure 13:
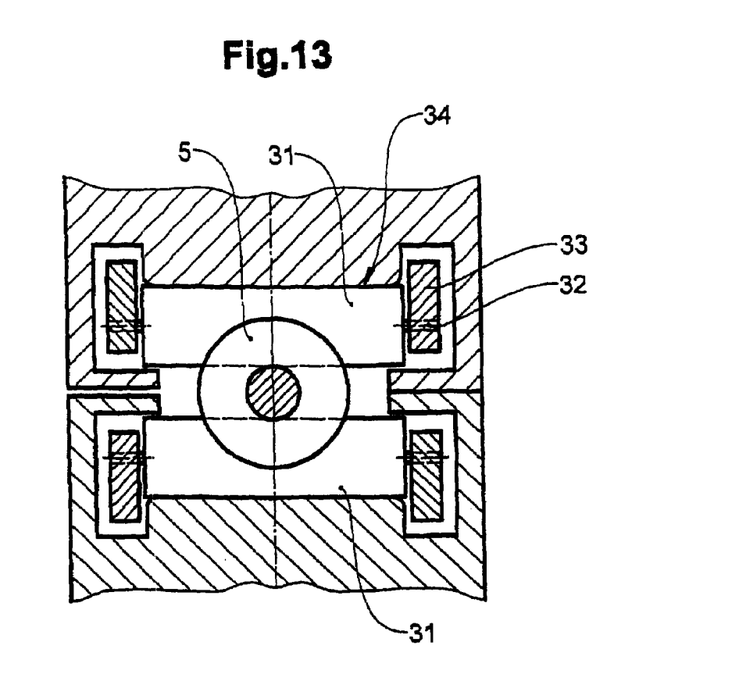
FIG. 13 shows a cross section through a section of the drive.

FIG. 13 shows a cross-section through a section of the drive of FIG. 12 of the conveyed links 5.

Figure 14:
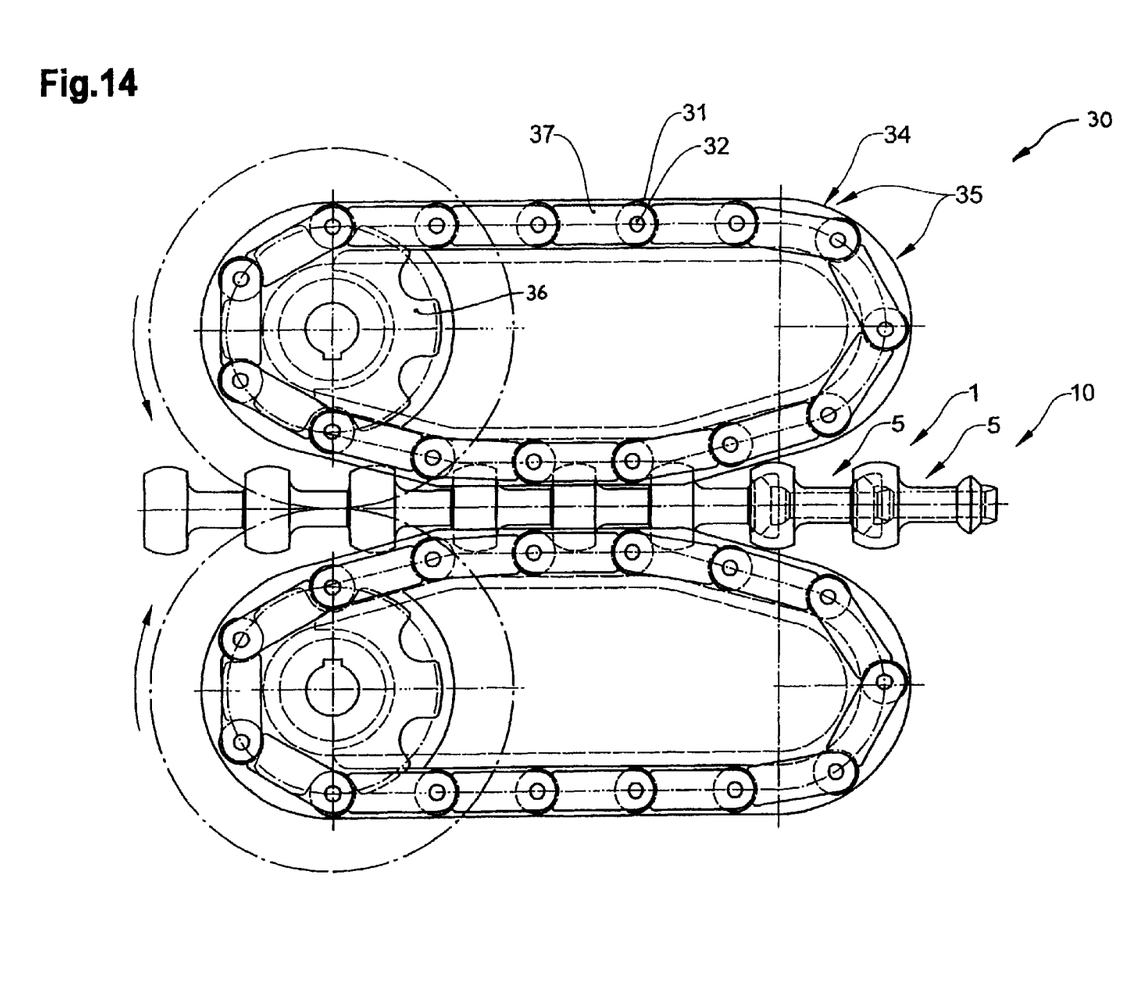
FIG. 14 shows a further variant of the drive.

FIG. 14 shows a further variant of the drive. This is similar in design to the one in FIG. 12, however, instead of the distancing elements 33 it comprises second distancing elements 37 of a different shape. These second distancing elements 37 are connected to the roller axes 32 on a first end, i.e. the roller axes 32 are movably or rigidly (depending on how the roller axes 32 are connected to the rollers 31) introduced into the second distancing element 37. On the first end the distancing elements 37 comprise, in conveying direction, a cylindrical surface directed towards the outside, coaxially to the respective roller axis 32. On the opposite, second end, the second distancing elements 37 comprise a cylindrical surface directed towards the inside of the same radius. This encloses the cylindrical outwardly directed surface of the succeeding second distancing element 37. In curved orbit sections of the orbit 34 succeeding second distancing elements 37 slide against each other as with a cylinder joint.

Figure 15:
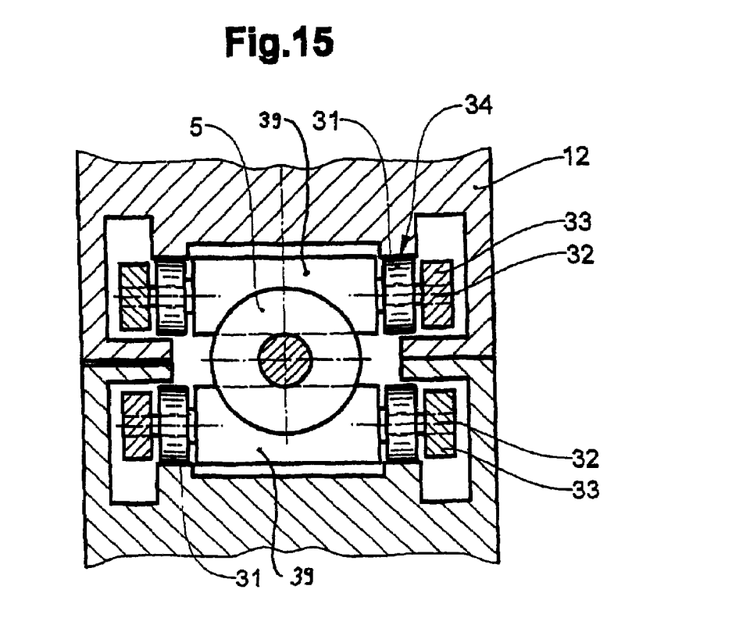
FIG. 15 shows a corresponding further cross section.

FIG. 15 shows a cross section through a section of the drive of FIG. 18 in the region of the conveyed links. Here the rollers are rotatably mounted separately from tappets 39 (pusher dogs). The tappets 39 engage the gaps between the links 5 and push—depending on the direction of movement—these on the front or rear side of the joint elements. This kind of tappet 39 is naturally also applicable to the embodiment of FIG. 12.

FIG. 16 diagrammatically shows a conveyor system with a guiding channel 12 with an active region 12a, through which a holding means 38 is lead and moved and a storage channel 12b in which that part of the conveyor unit 10, which is not located in the active region 12a, is stored. The drive 30 is schematically shown as a wheel, but may however be formed by a drive unit 30 based on a roller 35.

REFERENCE NUMERALS 1 first joint element
2 second joint element
3 joint socket
4 joint body
5 link
5a, 5b first/last link
6 base body
7 through hole
8 traction or pulling means
9 fastening means
10 conveyor unit
11 sliding ring
12 guiding channel
13 inner cone
14 first joint body surface
15 first joint socket surface
16 second joint body surface
17 second joint socket surface
18 joint socket aperture
19 through hole opening cone
20 transition surface
21 driving means
22 drive output means
30 drive unit
31 rollers
32 roller axes
33 distancing element
34 orbit
35 roller body
36 roller drive
37 second distancing element
38 holding means
39 tappet
51 first orbit section
52 second orbit section
53 third orbit section

The invention claimed is:

1. Conveyor system comprising:
   a guiding channel (12) with at least one conveyor unit (10) guided in the guiding channel (12) and movable along the guiding channel (12) and
   a drive unit (30) for driving the at least one conveyor unit (10),
   wherein the conveyor unit (10) comprises a succession of several links (5) and the links each comprise on a first end a first joint element (1) and on a second joint end (2) a second joint element (2),
   wherein the first and second joint elements (1, 2) are shaped correspondingly to one another and thus the conveyor unit (10) is designed for the transmission of pushing forces,
   wherein the drive unit comprises at least one roller body (35) consisting of a plurality of rollers (31), which are conveyable along an orbit (34) by means of a roller drive (36), and
   wherein the rollers (31) or tappets moved along with the rollers (31) engage with the links (5) of a conveyor unit (10) and thus drive the conveyor unit (10).

2. Conveying system according to claim 1, wherein the drive unit (30) comprises, for running the rollers (31) into a first orbit section (51), in which the conveyor units (10) are driven, or for running the rollers (31) off this first orbit section (51), a second orbit section (52) which leads to a third orbit section (S3), wherein the second orbit section (52) comprises a smaller curvature than the third orbit section (S3).

3. Conveying system according to claim 2, wherein the rollers (31), when passing from the second orbit section (S2) into the third orbit section (S3) or vice versa, the rollers (31) are not located within in a cylindrical envelope enclosing the conveyor unit (10).

4. Conveying system according to claim 1, wherein a conveyor unit (10), forms a closed loop and is guided around or through a driving means (21) and around or through a drive output means (22), wherein the driving means (21) and the drive output means (22) are designed for exerting or, respectively, absorbing traction forces or pushing forces to the conveyor unit or, respectively, from the conveyor unit (10).

5. Conveying system according to claim 1, comprising comprises several separately conveyable conveyor units (10), which are conveyable along the guiding channel (12) at arbitrary distances from each other.

6. Conveying system according to claim 1, wherein the guiding channel (12) comprises a first region (12a) through which a conveyor unit (10), the length of which corresponds to the length of this first region (12a), is conveyable and the guiding channel (12) comprises a second region (12b) as storage region.

7. Conveying system according to claim 6, wherein the second region (12b) is guided along the first region (12a).

8. Conveying system according to claim 1, wherein the conveyor units (10) each comprise a holding means for the permanent or temporary holding of objects to be transported.

9. Conveyor unit (10) for a conveying system according to claim 1, wherein the first joint elements (1) comprise joint sockets (3) and the second joint elements (2) comprise joint bodies (4), wherein the joint bodies (4) with the joint sockets (3) each form a ball and socket joint and the links (5) consist of one-piece base bodies on which the joint sockets and joint bodies (4) are formed.

10. Conveyor unit according to claim 9, wherein the first joint elements (1) have the shape of a spatial rotation ellipsoid on their outside and the second joint elements (2) have the form of a rotation cylinder, wherein each rotation cylinder connects to the first joint element (1) with one end and at the other end merges into the joint body (4).

11. Conveyor unit according to claim 9, wherein the joint sockets (3) and joint bodies (4) form a snappable connection without the joint sockets (3) comprising recesses or slots, which lead to an expanding of the joint sockets when being snapped.

12. Conveyor unit according to claim 11, wherein the links (5) each comprise sliding rings (11), which in the region of the joint sockets (3) are slid over the links (5) and thus prevent a snapping out of the joint bodies (4) out of the joint sockets (3) due to expansion of the joint sockets (3).

13. Link (5) of a conveyor unit (10) according to claim 9.

* * * * *